United States Patent
Thompson et al.

(10) Patent No.: US 9,190,854 B2
(45) Date of Patent: Nov. 17, 2015

(54) CHARGER EXTERNAL POWER DEVICE GAIN SAMPLING

(75) Inventors: Kerry Thompson, Fort Collins, CO (US); John McNitt, Fort Collins, CO (US); Mark Rutherford, Wellington, CO (US)

(73) Assignee: Broadcom Corporation, Irvine, CA (US)

( * ) Notice: Subject to any disclaimer, the term of this patent is extended or adjusted under 35 U.S.C. 154(b) by 463 days.

(21) Appl. No.: 13/526,768

(22) Filed: Jun. 19, 2012

(65) Prior Publication Data

US 2013/0335035 A1 Dec. 19, 2013

Related U.S. Application Data

(60) Provisional application No. 61/660,388, filed on Jun. 15, 2012.

(51) Int. Cl.
*H02J 7/04* (2006.01)
*H02J 7/16* (2006.01)
*H02J 7/00* (2006.01)

(52) U.S. Cl.
CPC .............. *H02J 7/0004* (2013.01); *H02J 7/042* (2013.01)

(58) Field of Classification Search
CPC ......... H02J 7/0004; H02J 7/007; H02J 7/042; H02J 7/045; H02J 7/0054; G01R 19/00; Y02T 10/7005; Y02T 10/7044; B60L 11/1861
USPC .................. 320/121, 132–136, 162
See application file for complete search history.

(56) References Cited

U.S. PATENT DOCUMENTS

| 6,507,173 | B1 | 1/2003 | Spiridon et al. | |
|---|---|---|---|---|
| 2003/0193318 | A1* | 10/2003 | Ozawa et al. | 320/132 |
| 2011/0031934 | A1 | 2/2011 | Pagano | |
| 2012/0268063 | A1* | 10/2012 | Qiu et al. | 320/107 |
| 2013/0214730 | A1* | 8/2013 | Lu et al. | 320/107 |

FOREIGN PATENT DOCUMENTS

| TW | 201014107 A1 | 4/2010 |
|---|---|---|
| TW | 201141000 | 4/2011 |

OTHER PUBLICATIONS

Arendarik, Stanislav, "Low Power Management Unit with MC34700 Demo Board Description," Freescale Semiconductor Application Note, Document No. AN3592, Rev. 1, Oct. 2008.
LP3970 Power Management Unit for Advanced Application Processor, Literature No. SNVS348F, Texas Instruments Incorporated, dated Aug. 2007.

(Continued)

*Primary Examiner* — Nghia Doan
(74) *Attorney, Agent, or Firm* — Brinks Gilson & Lione

(57) ABSTRACT

A power management unit accurately measures and controls charging current. The power management unit may be implemented more efficiently than prior designs, leading to cost savings in the implementation of the power management unit as well as in the implementation of the device that incorporates the power management unit. The power management unit incorporates a model of an external charge control device (e.g., a transistor) and uses that model in a way that allows the power management unit to eliminate external device pins and other circuitry.

21 Claims, 14 Drawing Sheets

(56) References Cited

OTHER PUBLICATIONS

TW 201014107, English abstract downloaded from Espacenet, Dec. 1, 2014, 2 pages.

TW 201114000, English abstract downloaded from Espacenet, Dec. 1, 2014, 1 page.

* cited by examiner

CHARGER EXTERNAL POWER DEVICE GAIN SAMPLING

CROSS-REFERENCE TO RELATED APPLICATION(S)

This application claims priority to and claims the benefit of U.S. Provisional Patent Application Ser. No. 61/660,388 filed on Jun. 15, 2012.

TECHNICAL FIELD

This innovation relates to power supply charging, such as battery charging. This innovation also relates to determining and controlling charging current.

BACKGROUND

Immense consumer demand for electronic devices of every variety has been driven in part by low cost manufacturing and ever increasing device functionality. Today, it is not unusual for a person to own multiple cell phones, portable gaming devices, music players, tablet computers, or GPS devices, and other devices. One common feature of these devices is that they depend heavily and sometimes exclusively on a rechargeable power source, such as a rechargeable battery. Improvements in battery charging will continue to make such devices attractive options for the consumer.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
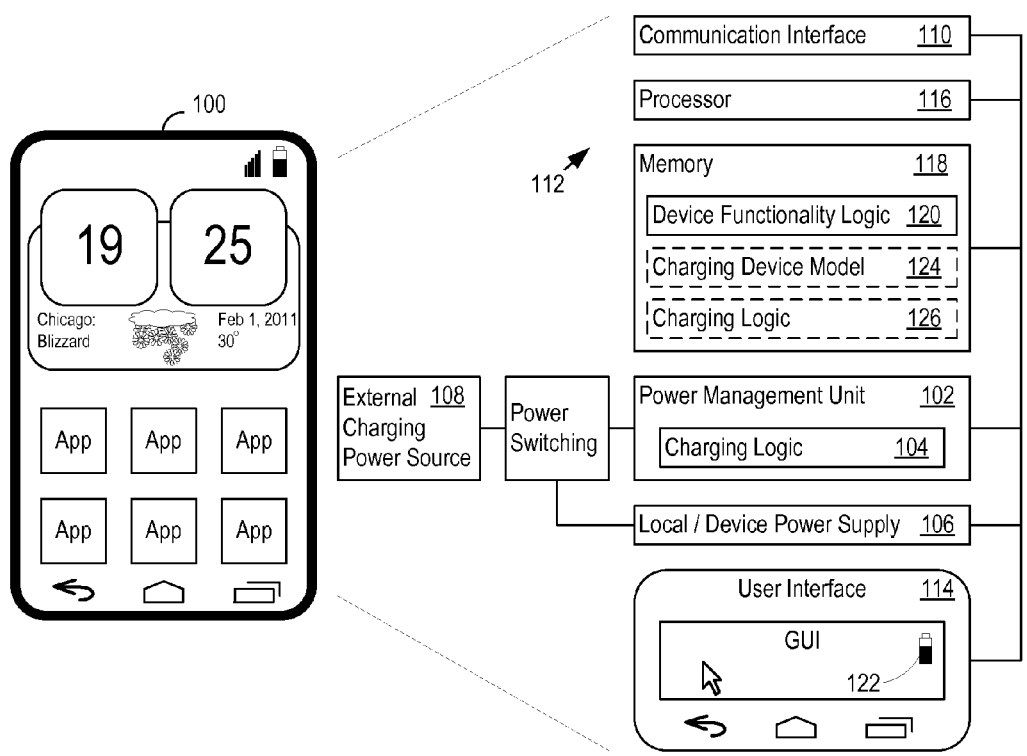
FIG. 1 is an example of a device that incorporates a power management unit.

FIG. 1 shows an example of a device 100 that includes a power management unit 102. In this example, the device 100 is a smartphone, but the device 100 could be any device that includes a rechargeable power supply, including a portable video game, music or video player, laptop computer, tablet computer, or other device. The power management unit (PMU) 102 includes charging circuitry 104 and controls charging of the power supply 106, including controlling the charging current to the power supply 106. The external power source 108 supplies the charging current.

The power supply 106 may be a rechargeable battery, for example. The chemistry of the rechargeable battery may vary widely. Examples include nickel metal hydride (NiMH), lithium ion (Li-ion), and lithium ion polymer (Li-ion polymer) chemistries. The external power source 108 may also vary widely. As examples, the external power source 108 may be a universal serial bus (USB) port, an alternative current (AC) power socket, a direct current (DC) power supply, an AC wall adaptor that outputs a DC voltage, or any other power source.

The device 100 includes a communication interface 110, which may include, as an example a wireless transceiver, an antenna, and a power amplifier (PA) that drives the antenna. The device also includes system logic 112 and a user interface 114. The system logic 112 may include any combination of hardware, software, firmware, or other logic. The system logic 112 and PMU 102 may be implemented, for example, in one or more systems on a chip (SoC), application specific integrated circuits (ASIC), with discrete circuitry, or in other manners. The system logic 112 is part of the implementation of any desired functionality in the device 100. As one example, the system logic 112 include a processor 116 and a memory 118 in which the device functionality logic 120 (e.g., applications in software or firmware) implements any desired functionality. In that regard, the system logic 112 may facilitate, as examples, running applications, accepting user inputs, saving and retrieving application data, establishing, maintaining, and terminating cellular phone calls, wireless network connections, processing global positioning signals, Bluetooth connections, or other connections, and displaying relevant information on the user interface 114. The user interface 114 may include a graphical user interface, touch sensitive display, voice or facial recognition inputs, buttons, switches, and other user interface elements.

In particular, the system logic 112 may monitor charge status of the power supply 106. To do so, the system logic 112 may communicate with the power management unit 102 to monitor charging activity and discharging activity with respect to the power supply 106. The system logic 112 may track the charging and discharging activity for the purposes of rendering a fuel gauge 122 or other charge status indicator on the user interface 114.

As noted above, the system logic 112 may include one or more processors 118 and a memory 120. The memory 120 stores, for example, device functionality logic 120 that the processor 118 executes to carry out whatever device functionality is desired. In some implementations, the memory 120 may store a charging device model 124 and charging logic 126 that facilitates monitoring and control over charging of the power supply 106. In other implementations, the power management unit 102 may incorporate all or part of the charging device model 124 and charging logic 126. The memory 120 itself may be implemented as non-volatile (but optionally reprogrammable) firmware memory, volatile system memory (e.g., SRAM or DRAM), or any combination of such memories. Accordingly, the charging device model 124 and charging logic 126 may be updated as desired. For example, when an improved device model becomes available, a network controller (e.g., a base station) may communicate the improved device model to the device 100 with instructions to replace the old device model with the improved device model in the memory 120 or in the PMU 102.

The charging logic 104 may include external devices. In other words, not all of the circuitry employed to charge the power supply 106 is necessarily included in a single ASIC or SoC that implements the power management unit 102 or the system logic 112. In part, this is due to the fact that semiconductor manufacturing processes tend to tolerate up to about 3 to 5 volts, while charging inputs are often specified to withstand input voltages of up to 20 volts or more, in case, for example, someone connects the wrong charger to the device 100. As a result, the power management unit 102 may employ external devices that can tolerate higher voltages to charge the power supply 106.

The power management unit 102 may monitor current through the external devices. In particular, the power management unit 102 may monitor current through an external switching device through which current flows to charge the power supply 106. The switching device may be a power transistor, such as a PNP or FET power transistor, but the switching device may be implemented in other ways depending on the particular device. Monitoring the current allows the power management unit 102 to ensure that charging currents into the power supply 106 are within acceptable bounds and to ensure that the charging currents that are being drawn from the power source 108 are within acceptable limits, as examples. In addition, current monitoring allows the power management unit 102 to track current into the power supply 106 while it is charging, and current out of the power supply 106 while it is powering the device 100. Having tracked these currents, the power supply 106 may provide fuel gauge functionality (sometimes referred to as Coulomb counter functionality) that determines the charge level of the power supply 106. In addition to current into and out of the power supply 106, the power management unit 102 obtains measurements of other currents, such as currents flowing to other loads, in order to ensure that the currents are within acceptable limits as noted above.

Figure 2:
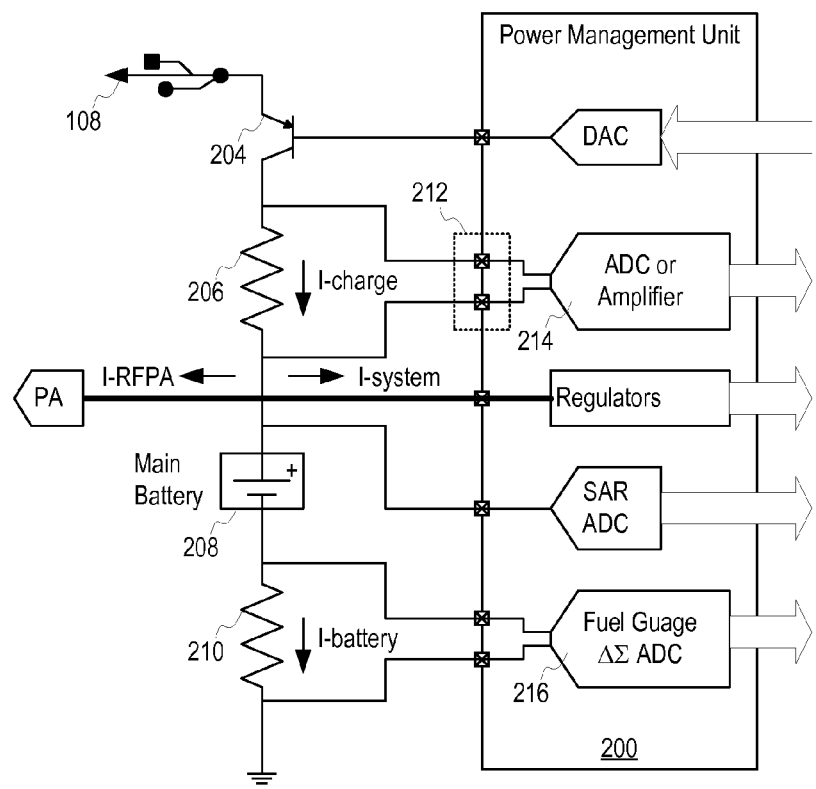
FIG. 2 shows a traditional charge monitoring technique.

FIG. 2 shows an example of a traditional charge monitoring technique 200. In FIG. 2, a USB external power source provides the charging current, I-charge, which flows through a switching device 204 (in this case a PNP power transistor) and the charging current sensing resistor 206 to a power supply 208 (e.g., a rechargeable battery). The current through the power supply 208, I-battery, flows through the battery current sensing resistor 210 to ground. In addition, some of the I-charge flows to other parts of the device, such as to a radio frequency power amplifier (RFPA) (e.g., to drive an antenna) and to system devices (e.g., digital logic). FIG. 2 labels these two currents as I-RFPA and I-system. The current flowing to parts of the device other than the power supply 208 is referred to below as supplemental current, I-sup, and there may be additional, fewer, or different currents that compose I-sup, besides I-RFPA and I-system. I-charge=I-sup+I-battery, and for the example in FIG. 2, I-charge=I-system+I-RFPA+I-battery.

In FIG. 2, the voltage across the charging current sensing resistor 206 provides a measure of I-charge. To measure I-charge, device pins 212 convey the voltage across the charging current sensing resistor 206 to measurement circuitry 214 internal to the power management unit 200, such as an analog to digital converter (ADC). Similarly, the voltage across the battery current sensing resistor 210 provides a measure of I-battery. The measurement circuitry 216 internal to the power management unit 200, such as a delta-sigma ADC, measures the voltage across the battery current sensing resistor 210 to determine I-battery. Note that the charging current sensing resistor 206, measurement circuitry 214, and device pins 212 are needed in the design shown in FIG. 2 to determine I-charge, because measuring I-battery is not the same as measuring I-charge due to the supplemental currents. The presence of the current sensing resistor 206, measurement circuitry 214, and device pins 212 add complexity and cost to the design.

Figure 3:
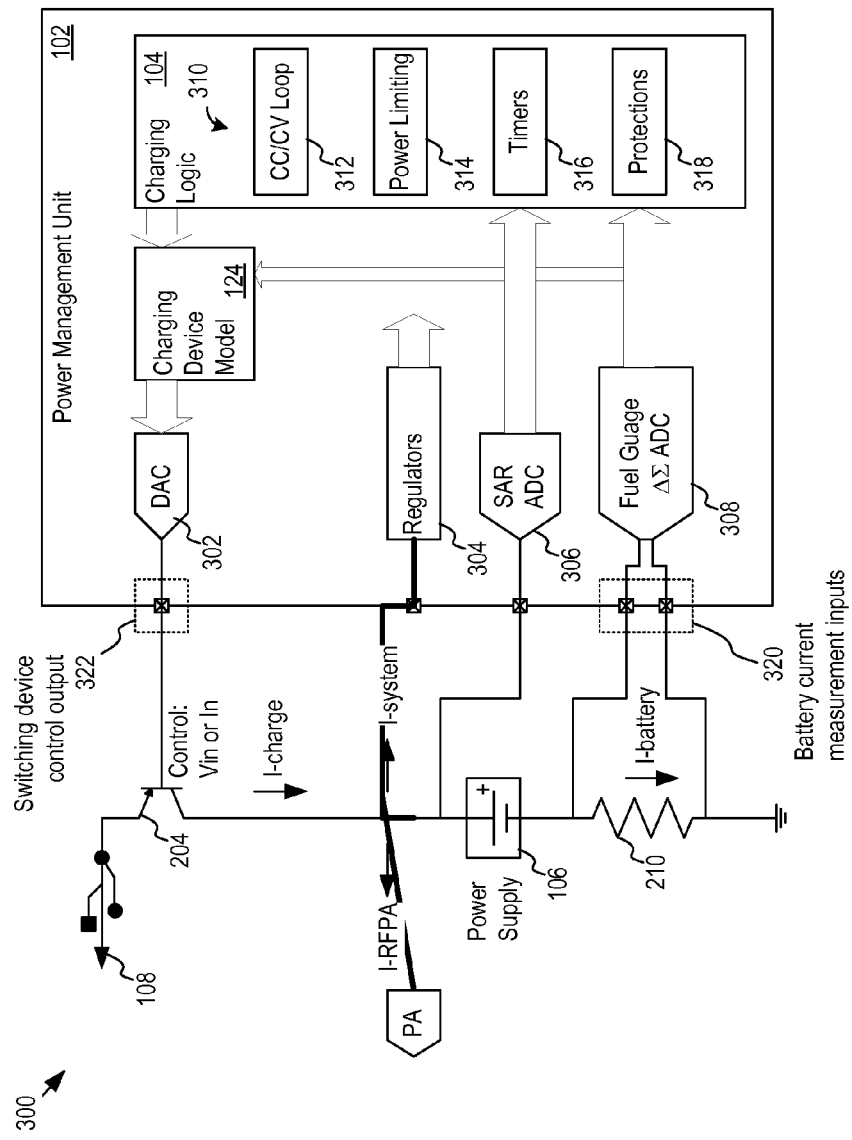
FIG. 3 shows an example of a power management unit that employs a power device model to more efficiently monitor and control charging current.

FIG. 3 shows a charging design 300 in which the power management unit 102 uses a charging device model 124. The charging configuration 300 eliminates the charging current sensing resistor 206, the measurement circuitry 214 internal to the power management unit, as well as the device pins 212. As a result, the charging design 300 may result in a less complex and costly design for the device 100.

The charging design 300 includes driving circuitry 302, regulators 304, and voltage measurement logic, such as a successive approximation (SAR) analog to digital converter (ADC) 306 which measures power supply voltage, and a fuel gauge delta-sigma ADC 308 with measures I-battery through the battery current measurement inputs 320. The driving circuitry 302 may be a DAC with 10-14 bit resolution operating at 2-30 mega samples per second (MS/s) to drive the switching device 204, directly or indirectly, through the switching device control output 322. The regulators 304 provide whatever voltages (e.g., 3.3 V or 5V) are used by any other circuitry in the device 100. The SAR ADC 306 may have 8 to 12 bits of resolution and operate at 0.2-1 MS/s, while the fuel gauge ADC may have 12-14 bits of resolution and operate at 5-15 KS/s. The specifications of any of the circuitry in the charging design 300 may vary depending on the implementation of the PMU 102.

Figure 4:
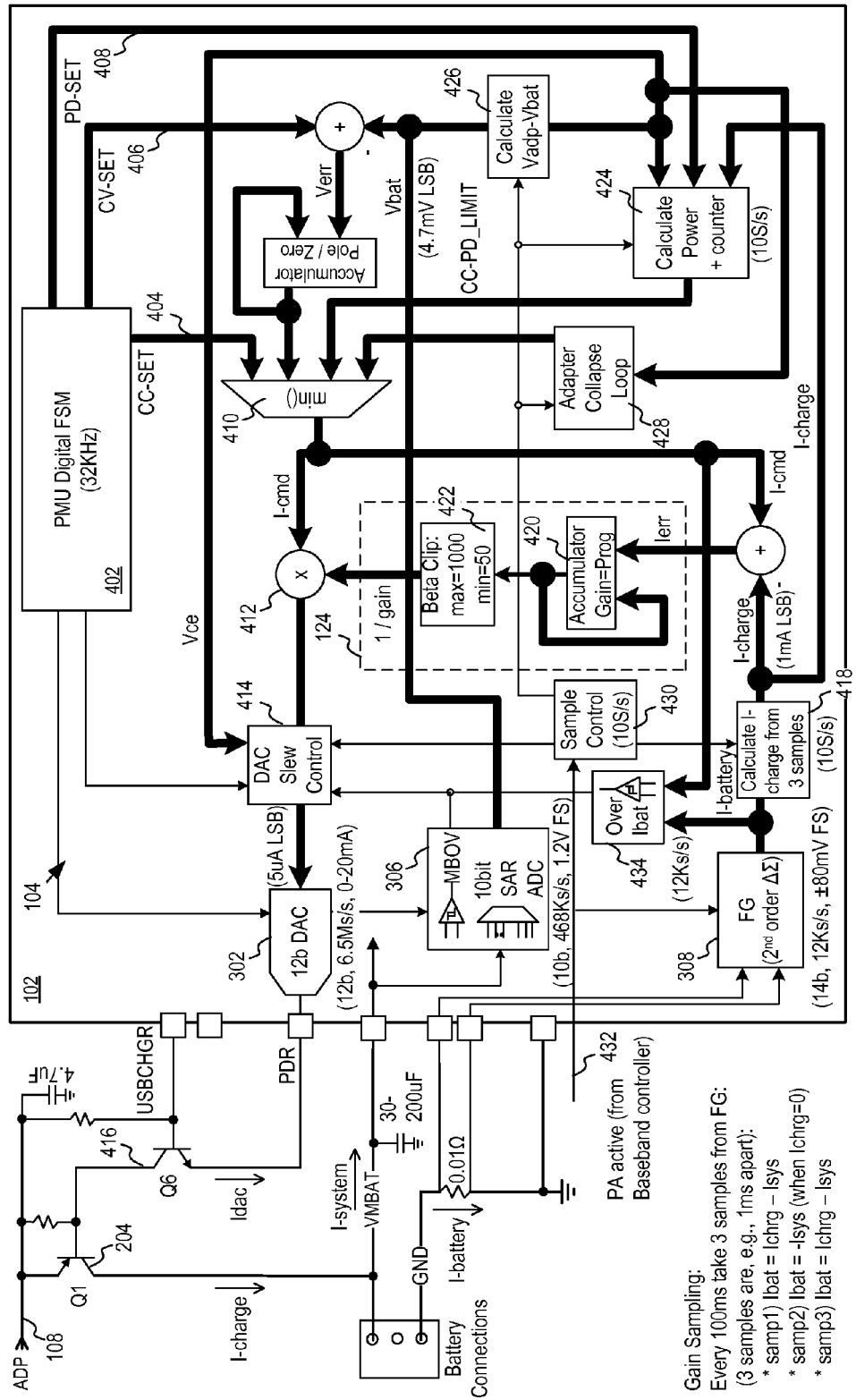
FIG. 4 shows example implementation of a power management unit using a device model.

As shown in FIG. 3, the charging logic 104 also includes the functional blocks 310. The functional blocks may include a constant current/constant voltage loop 312, power limiting logic 314, timers 316, and protection logic 318. FIG. 4 illustrates one example of the way in which the functional blocks 312 may be implemented.

In the charging design 300, driving circuitry 302 drives current into the base of the power transistor 204. The driving circuitry 302 may be implemented as a digital to analog converter (DAC), for example. In particular, the driving circuitry 302 adjusts the operating point of the power transistor 204 to allow a desired amount of I-charge to flow from the external power source 108. As will be described in more detail below, the PMU 102 intelligently controls the power transistor 204 to obtain measurements of I-charge without the additional circuitry shown in FIG. 2.

In the charging design 300, the PMU 102 causes the measurement circuitry 216 to measure I-battery, while the power transistor 204 is allowing I-charge to flow. Then, the power management unit 102 uses the driving circuitry 302 to turn off the power transistor 204, and to take a second measurement of I-battery. However, since the power supply 106 is not being charged while the power transistor 204 is off, the second measurement of I-battery is actually a measure of the supplemental current, I-sup (specifically negative I-sup). In other words, with the power transistor 204 turned off, the power supply 106 provides power to the device 100, including the I-sup currents, that the second measurement captures. The PMU 102 then determines the difference between the first measurement and the second measurement to obtain a first measurement of I-charge. In other words, I-charge1=I-battery1−I-battery2, where I-battery1 is the I-battery measurement with the power transistor 204 supplying charging current, and I-battery2 is the I-battery measurement with the power transistor 204 turned off. After the second measurement, the power management unit 102 drives the power transistor 204 to again provide charging current to the power supply 106. Furthermore, the PMU may obtain a third measurement, I-battery3, once charging current is again flowing, and may determine a second measurement of I-charge as I-charge2=I-battery3−Ibattery2.

The PMU 102 may space the samples of I-battery to avoid device events that have a transitory influence on I-charge. For example, the PMU 102 may delay or otherwise reschedule measurements of I-battery to avoid times when the device activates or deactivates the PA (e.g., to transmit a 2G/3G/4G burst). A PA activation/deactivation signal may be provided to the PMU 102 by a baseband controller chip that schedules such bursts. Furthermore, the PMU 102 may offset I-battery samples on a pseudo-random basis to avoid regular periodic device activity that might introduce a repeating bias into the measurements. With this framework in mind, the PMU 102 may, for example, nominally take samples every 100 ms, with the three samples spaced 1 ms apart. However, any other spacing between samples or sets of samples may be used, with the spacing dependent on any one or more of the power source characteristics, switching device 204 characteristics, power supply 106 characteristics or other device characteristics.

The device model 124 provides a mechanism by which the power management unit 102 controls I-charge by driving the switching device 204 (or any other switching device used instead, such as an FET). As an overview, the device model 124 models the gain of the switching device 204 (e.g., the beta of the PNP transistor). As a result, the charging logic 104 can determine the I-charge output given the strength of the signal driving the switching device 204. The driving signal may be a current in the case of a BJT switching device, or a voltage in the case of a FET switching device. The gain may vary widely between switching devices 204, but typically changes slowly and most strongly with temperature. The PMU 102 may sample I-battery 5-10 times faster than the rate at which the gain changes due to other factors, for example. Although FIG. 3 shows the driving circuitry 302 directly driving the switching device 204 (e.g., directly driving the base of the PNP transistor), the driving circuitry 302 may instead drive intermediate stages first, as will be shown below with respect to FIG. 4.

FIG. 4 shows another view of the PMU 102. A finite state machine (FSM) 402 controls the PMU 102, including three loops: a CC-Set loop 404, a CV-Set loop 406, and a PD-Set loop 408. The FSM 402 drives the CC-Set loop 404 with a value representing the desired charging current, drives the CV-Set loop with a value responsive to battery voltage (e.g., for end of charging cycle current control), and drives the PD-Set loop 408 with a value representing the current that should not be exceeded for power dissipation control in the switching device 204. The PMU 102 applies a restriction logic 410 (e.g., a minimum value selector) to select the smallest current of the several options for I-charge, and the resulting value is shown as I-cmd, for the actual current commanded for I-charge. In this way, if any control loop needs to restrict or completely shut down I-charge, it can do so by restricting or setting to zero its current value input to the restriction logic 410.

The device model 124 provides a device gain (e.g., in the form of 1 over gain) which the multiplier 412 multiplies against I-cmd. The resulting driving value is delivered through the DAC slew control 414 to drive the switching device 204. In the example of FIG. 4, the driving circuitry 302 drives the switching device 204 through the first stage driver 416. The DAC slew control 414 introduces a gradual turn off and turn on waveform shape to what would otherwise be a fast transition switching signal. Doing so may help reduce RF noise and switching transients typically produced by fast signal transitions.

The calculation block 418 determines I-charge from, for example, three samples of I-battery as described above. The three samples of I-battery yield two measurements of I-charge, also as described above. The two measurements of I-charge yield two different error terms compared to what I-charge current was actually commanded via I-cmd:

$$I\text{-err1}=[I\text{-battery(sample1)}+I\text{-battery(sample2)}]-I\text{-cmd};$$

$$I\text{-err2}=[I\text{-battery(sample3)}+I\text{-battery(sample2)}]-I\text{-cmd};$$

The PMU 102 may select the I-err for updating the device model 124 by applying any desired selection function. For example, the PMU 102 may select I-err as: I-err=min(I-err1, I-err2).

In other implementations, the PMU 102 may obtain one I-err measurement, or more than two I-err measurements, and combine them in any desired way (e.g., by averaging, weighted averaging, or discarding high or low values) to obtain an I-err value for updating the device model 124.

The device model 124 includes an accumulator 420 and a clip control 422. The accumulator 420 accumulates I-err in an attempt to drive I-err to zero by adjusting the device gain applied to the multiplier 412. The optional clip control 422 may prevent the device gain from exceeding a selected programmable clipping ceiling (e.g., 1000), and from falling below a selected programmable clipping floor (e.g., 50). Thus, the accumulator 420 increases the device gain to drive I-err to zero. The device model 124 may start with an artificially high value of device gain to ensure that the I-charge starts artificially low, to provide a soft start to the charging process. When the device gain starts artificially high, there will be substantial I-err because I-charge will be too low compared to I-cmd. The device model 124 responds by reducing the gain value. As a result, the (1 over gain) term applied to the multiplier increases, thereby increasing the current or voltage eventually driving the switching device 204, leading to increased I-charge.

The power limiting functions 314 and protection functions 318 are also present in FIG. 4. For example, the CV-Set loop 406 may command reduced current as the battery voltage approaches any desired set point (e.g., an end of charging voltage). The Verr term shown in FIG. 4 represents how close the battery voltage is to the set point, and as the set point approaches, the commanded current may be reduced (and may fall below the CC-Set loop 404 value). As another example, the PD-Set loop 408 may include power control logic 424 for monitoring power dissipation of the switching device 204. If the power exceeds any selected set point over a selected number of samples, then the power control logic 424 may reduce or drive to zero the commanded current. The power control logic 424 may determine the power according to the I-charge and the voltage across the switching device 204, determined by the calculation block 426 as the external power source 108 adapter voltage (Vadp) minus the battery voltage (Vbat). The power control logic 424 may limit the commanded current to a value 10% lower (or another programmable value) than the current that would result in the maximum allowed power dissipation, for example.

As another example, the adapter collapse logic 428 may determine whether the adapter voltage falls or rises significantly, indicating that more current is trying to be pulled from the adapter than it can supply. To prevent an undesirable swing in charging current if the adapter suddenly recovers, the adapter collapse logic 428 may reduce the commanded current until the adapter voltage has stabilized. Additional protections include I-charge shutdown when the overcurrent logic 434 detects that too much battery current is flowing, and I-charge shutdown when the SAR ADC 306 detects that the battery voltage exceeds a predetermined threshold.

As noted above, the PMU 102 may space the samples of I-battery to avoid device events that have a transitory influence on I-charge. For example, the PMU 102 may delay or otherwise reschedule measurements of I-battery to avoid times when the device activates or deactivates the PA (e.g., to transmit a 2G/3G/4G burst). Furthermore, the PMU 102 may offset I-battery samples on a pseudo-random basis to avoid regular periodic device activity that might introduce a repeating bias into the measurements. To accomplish these goals, the PMU 102 may include the sample control logic 430. The sample control logic 430 may include one more programmable timers that set the sample period (e.g., 100 ms), as well as one or more pseudo-randomization counters that add an offset to the sample time for a set of samples or to individual samples. The offset may vary widely, but in one implementation it may be plus or minus 10% (e.g., a set of three samples starts every 90 ms to 110 ms). The PA input signal 432 may cause any of the timers in the sample control logic 430 to halt while the PA signal is asserted, so that samples are not taken during PA activity.

There need not be a strict division between what is considered the charging logic 104 and what is considered the PMU 102. The charging logic 104 may represent the entire PMU 102. In other views, the charging logic 104 may represent a subset of the PMU 102, such control loops 404, 406, 408 and FSM 402. The charging logic 104 may further be considered to include the device model 124.

Figure 5:
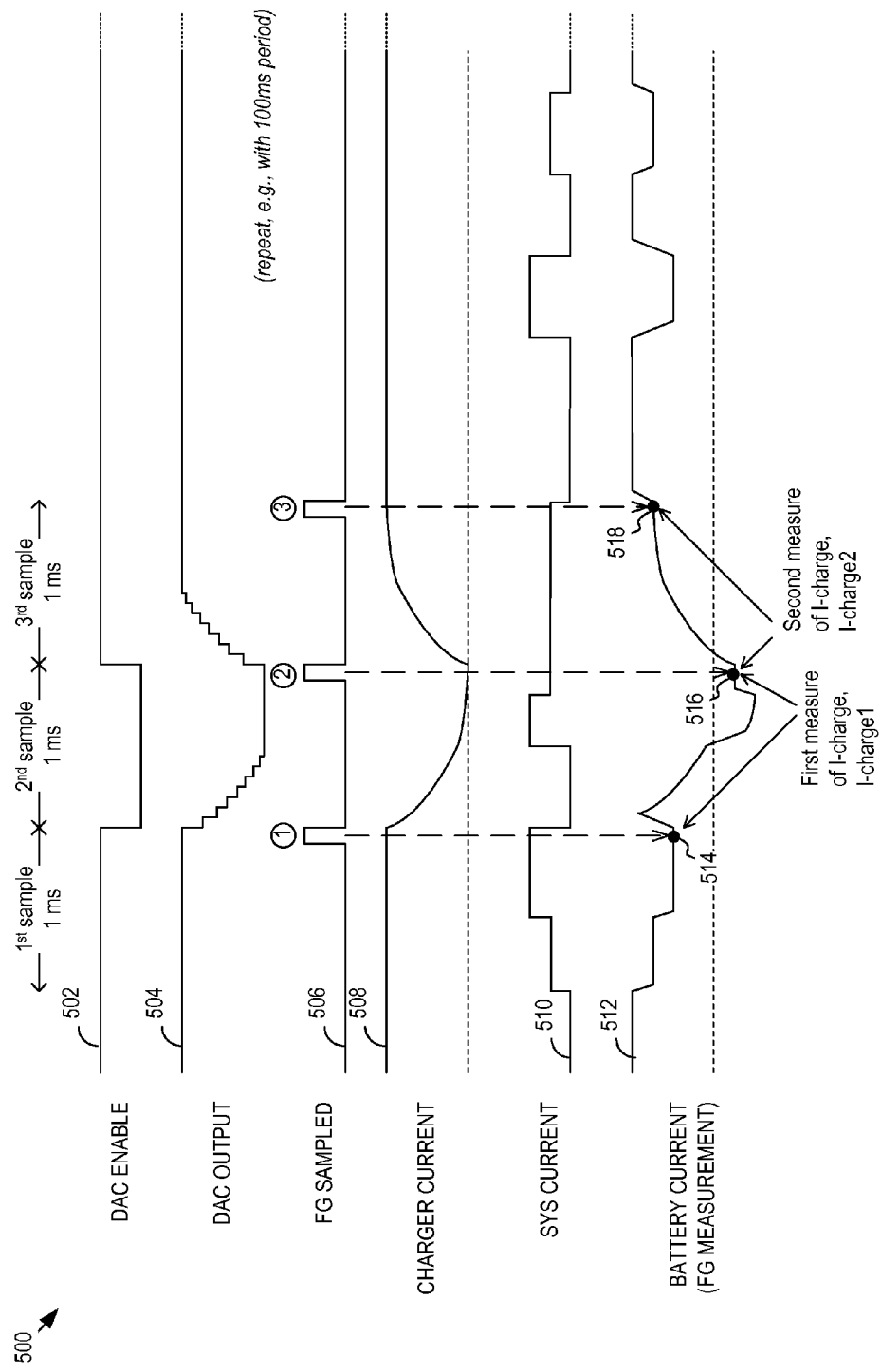
FIG. 5 shows example waveforms of taking battery current measurements.

FIG. 5 shows example waveforms 500 of taking battery current measurements. FIG. 5 shows a DAC enable output 502, a DAC output 504, and a sampling waveform 506 showing when the three I-battery samples are taken. In addition, FIG. 5 shows a charger current (I-charge) waveform 508, a system current (I-system) waveform 510, and a battery current (I-battery) waveform 512. In particular, the PMU 102 provides the DAC enable output 504 to the slew control 414, which generates the DAC output 504. The DAC output 504 turns the switching device 204 on and off in a controlled manner.

At point 1, the PMU samples I-battery with the switching device 204 on to obtain the first I-battery sample 514. At point 2, the PMU has turned off the switching device 204 and the charging current has therefore fallen to zero. The power supply 106 therefore supplies I-system at the time of the second I-battery sample 516. At point 3, the PMU has turn on the switching device 204 and the charging current has resumed flowing from the power source 108 when the third I-battery sample 518 is taken. Any I-battery sample may be randomized in time using a random offset to the nominal sample spacing of (for example) 1 ms every 100 ms. Furthermore, if the baseband controller asserts a PA activation/deactivation signal, the PMU may delay taking the I-battery sample until the PA activation/deactivation signal is de-asserted.

Figure 6:
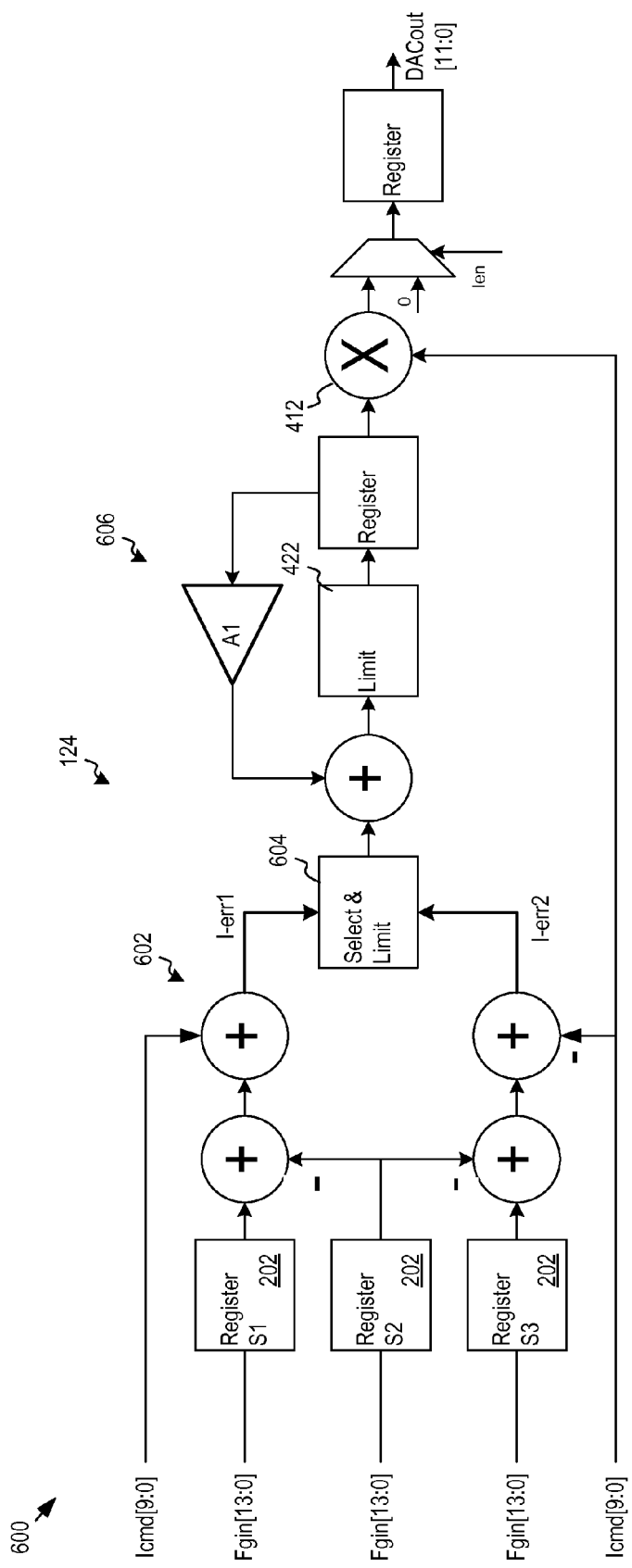
FIG. 6 is an example of how the device model may be implemented.

FIG. 6 shows an example 600 of how the device model 124 may be implemented. The three samples described above are represented as the fuel gauge inputs (FGin[13:0]), while the commanded current is represented as Icmd[9:0]. Different implementations may use different bit resolutions for these parameters. The adders 602 produce the two values of I-err noted above, while the selection and limiting logic 604 selects an I-err value (e.g., by selecting the minimum or I-err1 and I-err2), and may also limit the I-err value from exceeding a selected programmable ceiling value or falling below a selected programmable floor value. The filter 606 may implement the gain accumulator 420, with the accumulator loop feedback value a1 determined according to:

$$a_1 = \left(\frac{-1}{Ts * w_p + 1}\right) = \left(\frac{-\frac{f_s}{f_p}}{2\pi + \frac{f_s}{f_p}}\right)$$

where Ts represents the sampling period, wp represents the pole frequency in radians, fs represents the sampling clock frequency (Ts=1/fs), and fp represents the pole frequency (wp=2×pi×fp). This equation represents the A1 feedback term 606 that implements a low pass filter function with a pole location at fp. The pole location fp may be chosen to be 5 to 10 times lower than the sampling clock frequency fs. The low pass filter function integrates the selected error 604 and allows the overall feedback loop 600 to drive this error to zero in a controlled manner.

Figure 7:
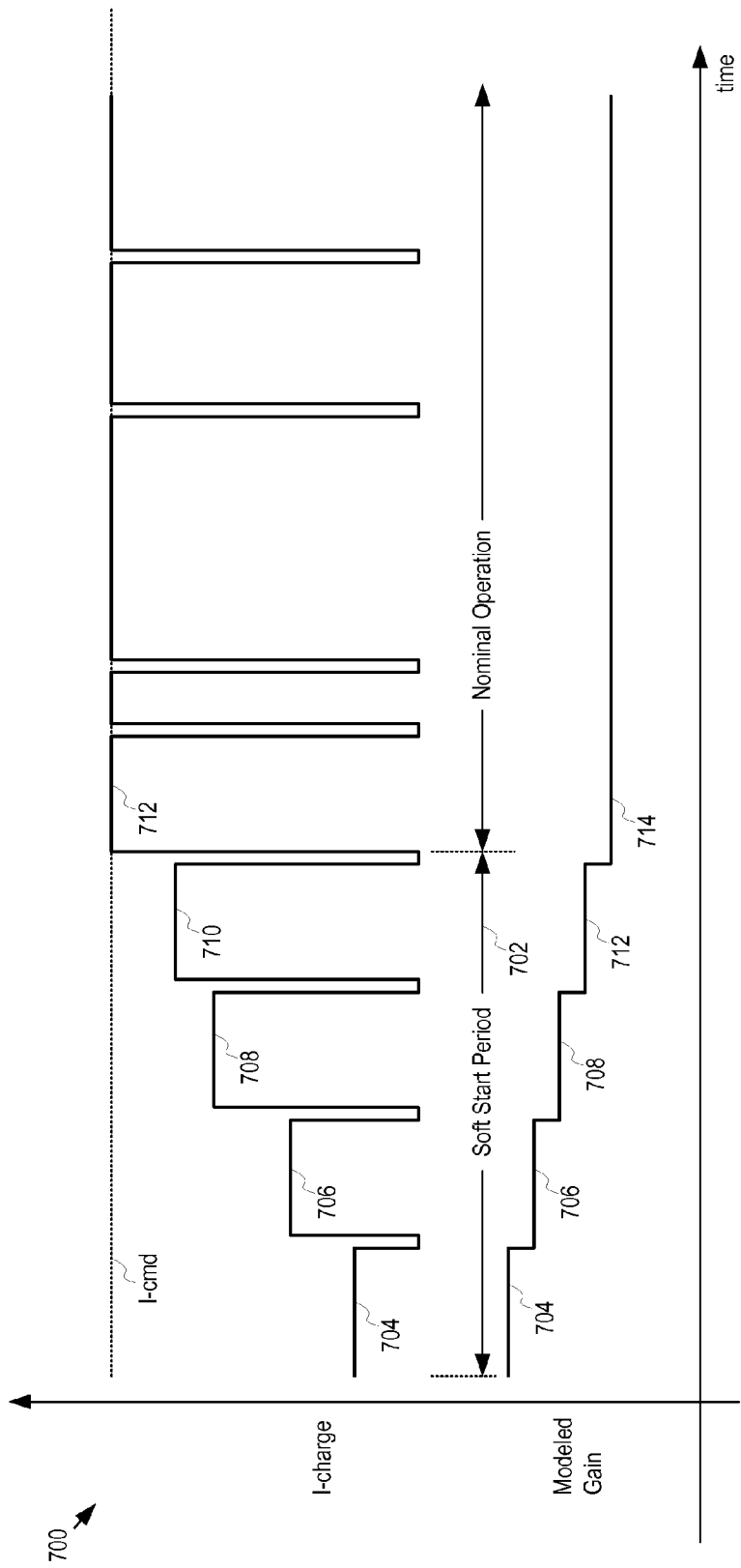
FIG. 7 is an example of soft start.

FIG. 7 shows an example of soft start 700. As noted above, the device model 124 may start with an artificially high value of device gain to initially keep I-charge low during a soft start period 702. At multiple points in time as the PMU 102 operates, the PMU measures I-charge, and adjusts the device gain supplied to the multiplier 412 to drive the I-err to zero and reach the commanded current I-cmd. In FIG. 7, the device model 124 reduces device gain in a controlled manner from the initial artificially high value 704 through the series of reduced gain values 706, 708 and 712 to reach the nominal gain point 714 where I-charge=I-cmd. At each change in device gain, I-charge increases toward the commanded value, I-cmd, as indicated by I-charge measurements 716, 718, 720, 722, and 724.

Figure 8:
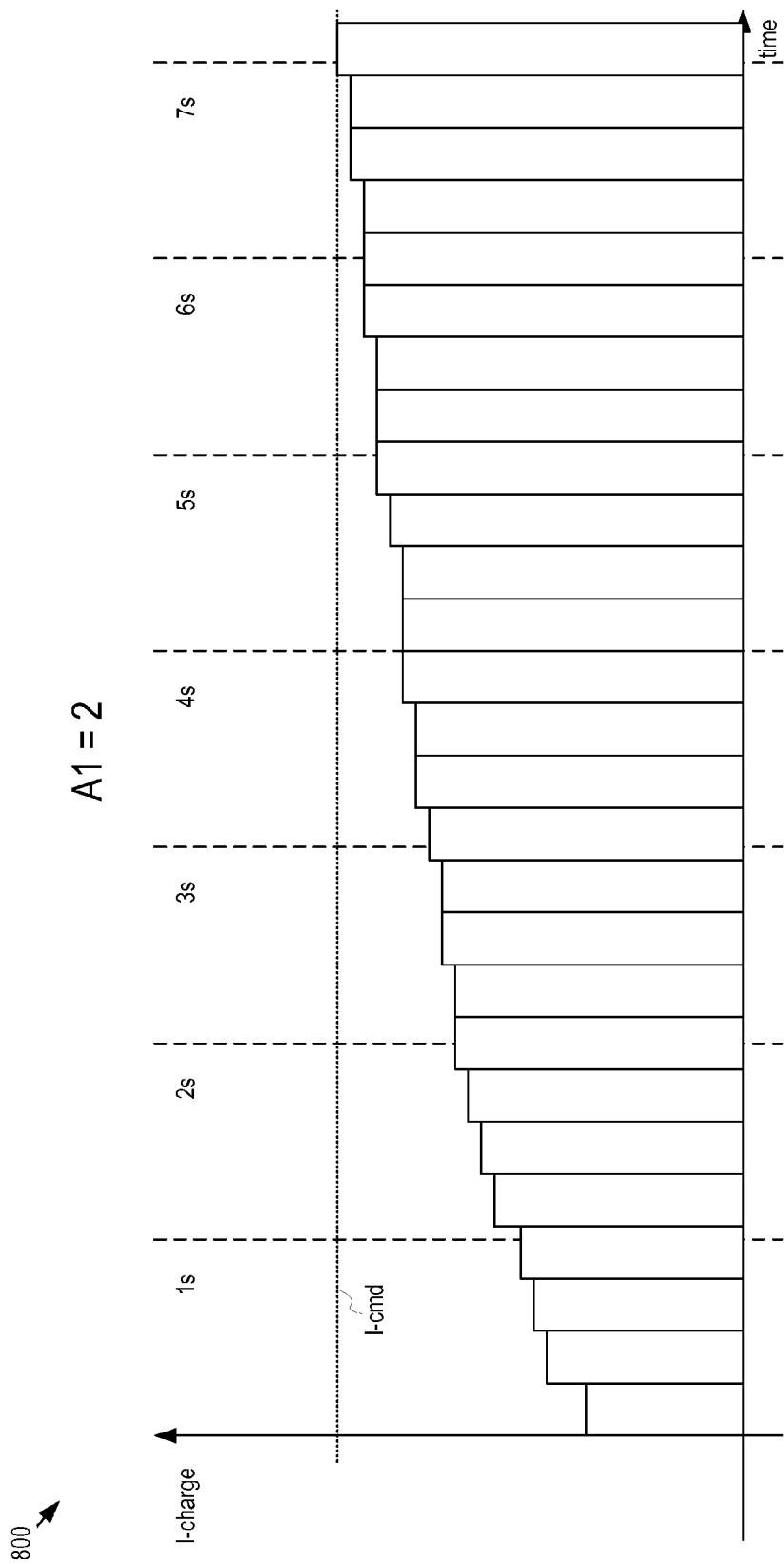
FIGS. 8, 9, and 10 represent different examples of how the power management unit increases charging current toward a commanded value with different loop feedback values.
Figure 9:
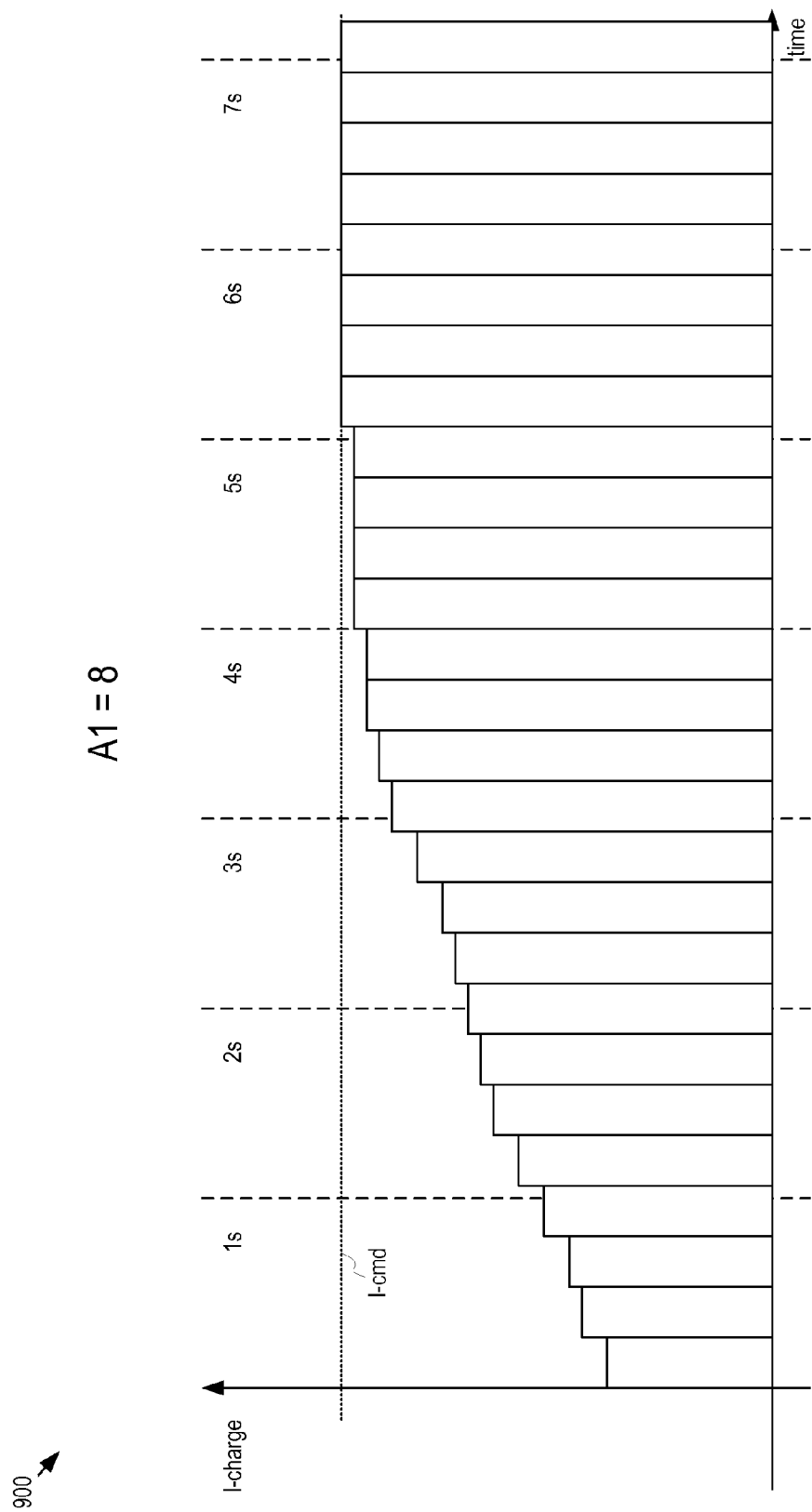
Figure 10:
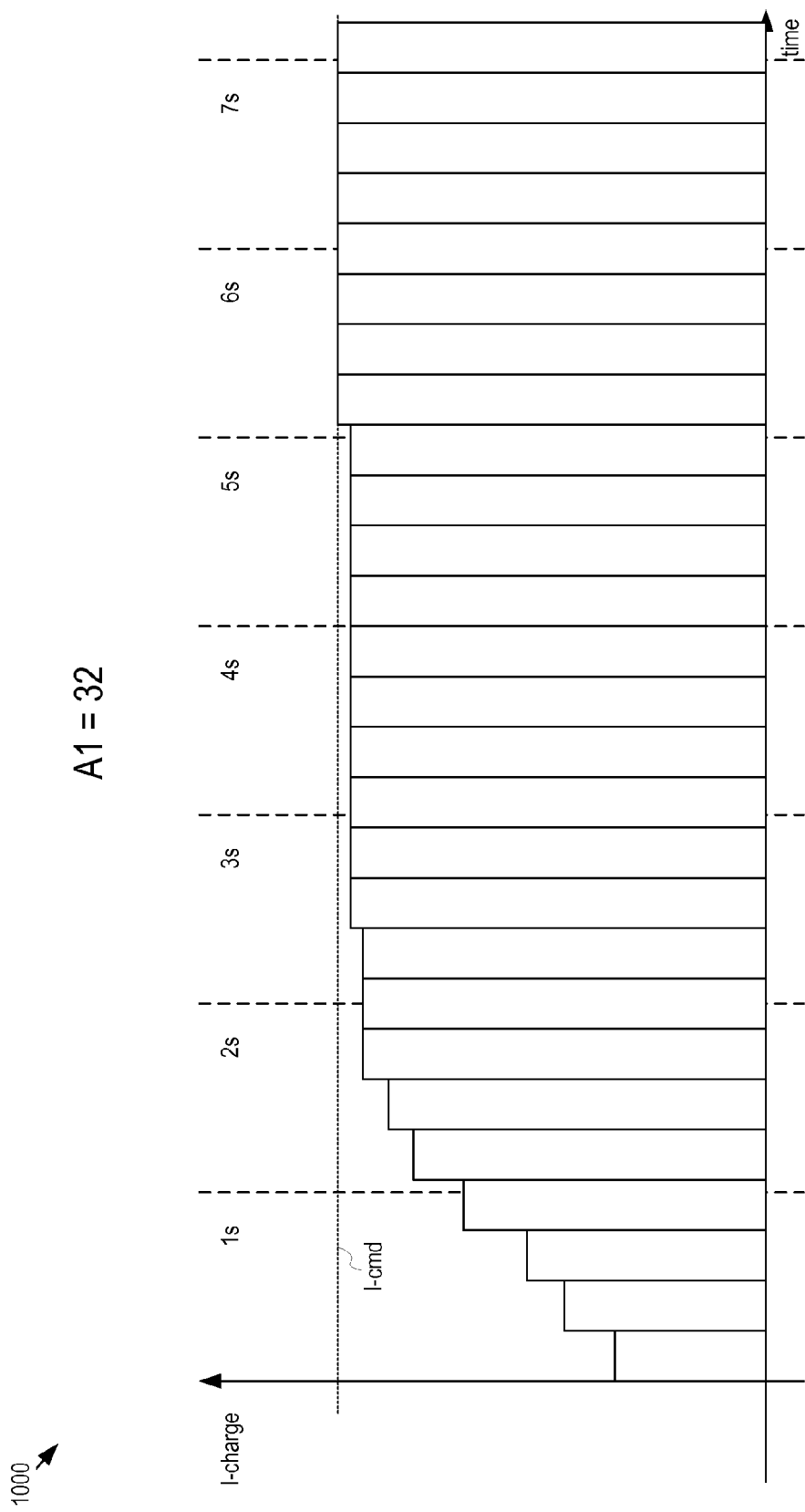

FIGS. 8, 9, and 10 represent different examples 800, 900, and 1000 respectively of how the power management unit 102 increases charging current toward a commanded value with different accumulator loop feedback values. FIG. 8 shows an example in which a1=2, FIG. 9 shows an example in which a1=8, and FIG. 9 shows an example in which a1=32. As the Figures show, increasing the accumulator loop feedback value makes the device model 124 adjust the charging current more quickly to the commanded current, I-cmd.

Figure 11:
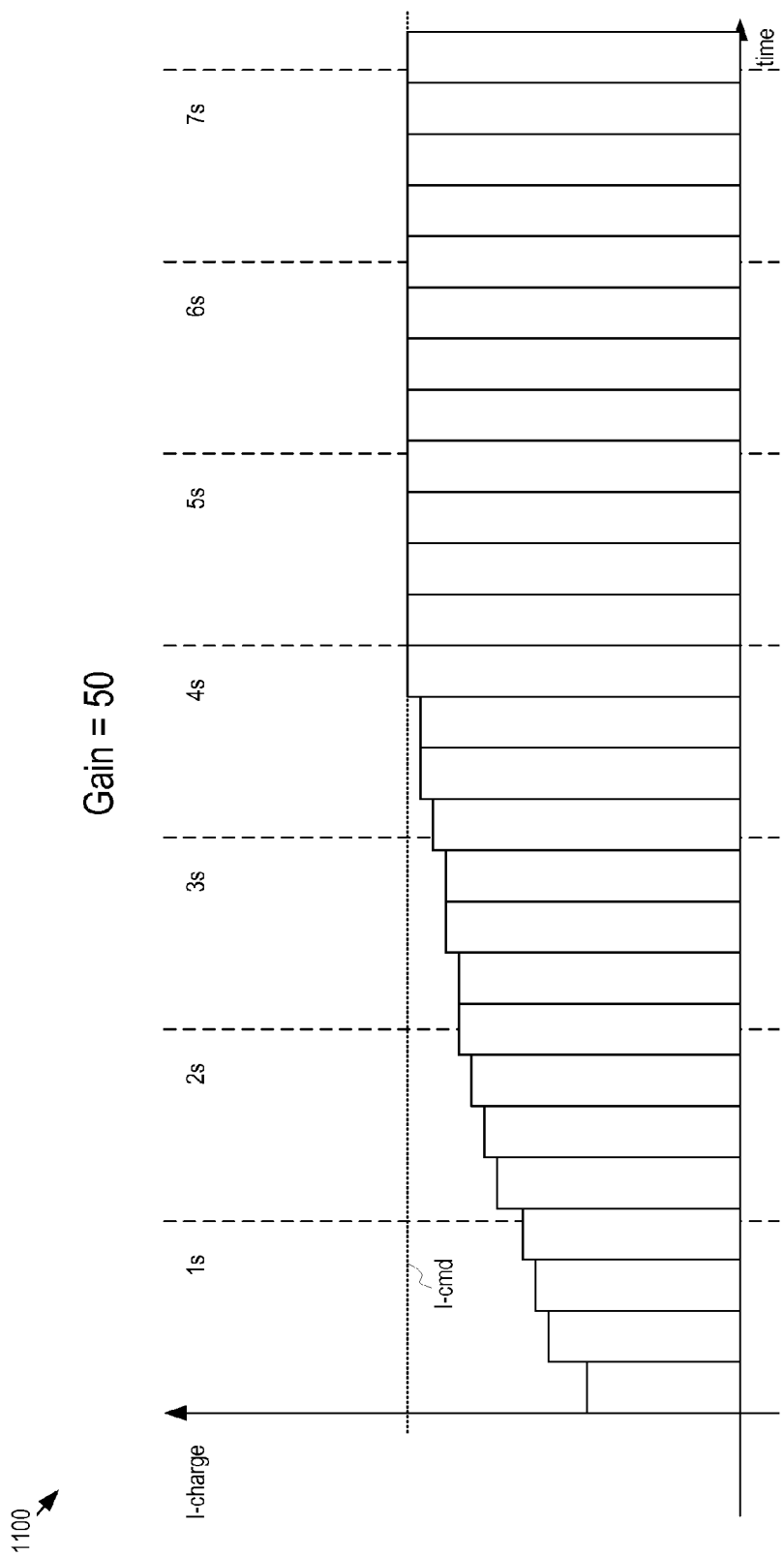
FIGS. 11, 12, and 13 show different examples of how the power management unit increases charging current toward a commanded value assuming different gains for switching devices.
Figure 12:
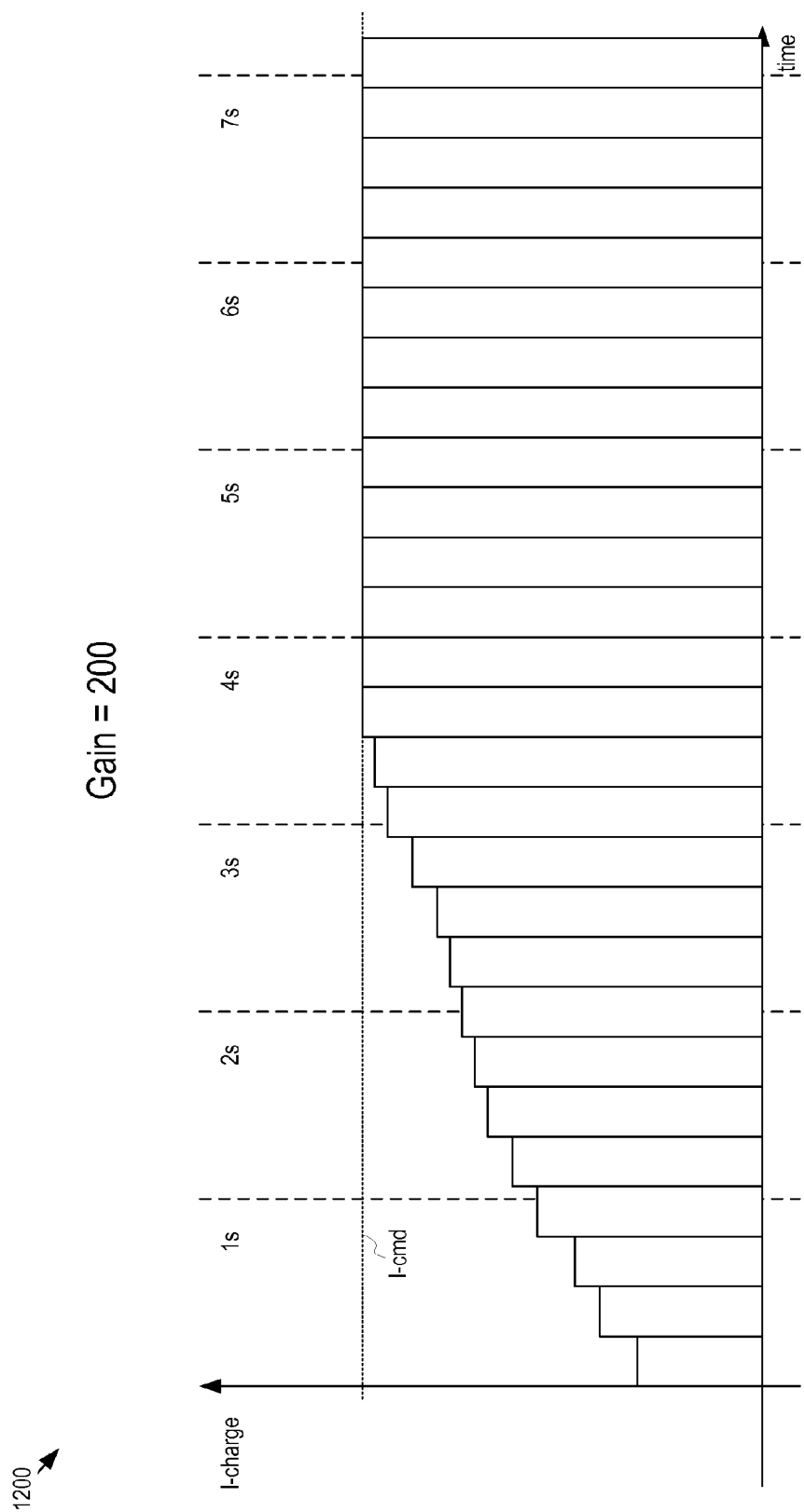
Figure 13:
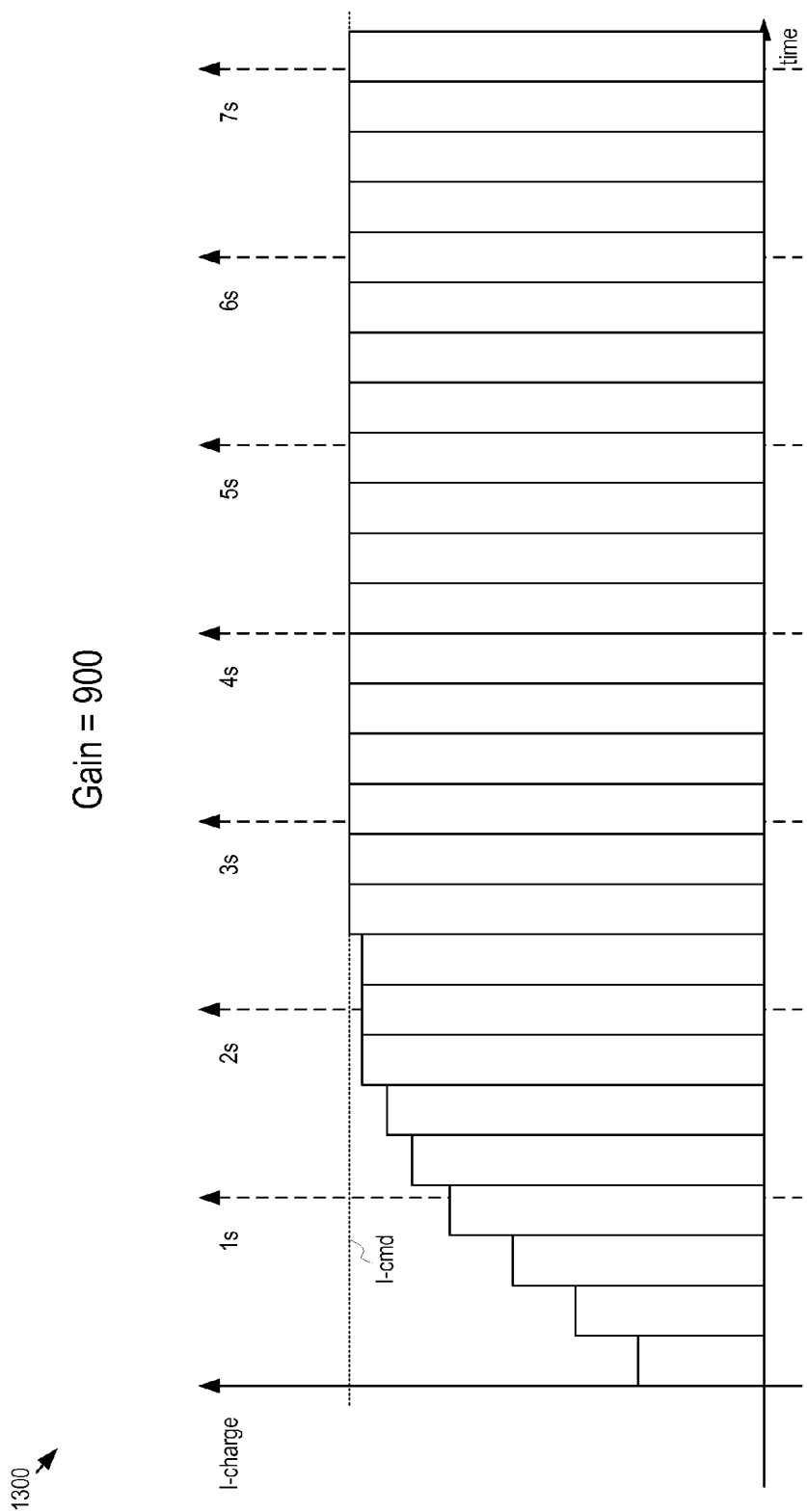

FIGS. 11, 12, and 13 show different examples 1100, 1200, and 1300 respectively of how the power management unit 102 increases charging current toward a commanded value assuming different gains for switching devices. FIG. 11 shows an example in which gain=50, FIG. 12 shows an example in which gain=200, and FIG. 13 shows an example in which gain=900. As the Figures show, as the gain of the switching device 204 increases, it takes less time for the device model 124 to adjust the charging current to the commanded current, I-cmd. One reason for this is that the device model starts with what was presumed to be an artificially high gain. Thus, it takes longer for the charging current to reach I-cmd when the gain of the switching device is relatively low (50 or 200, as examples), compared to the situation in which the gain of the switching device is 900, and actually is close to the presumed artificially high starting value (e.g., which may be 1000).

Figure 14:
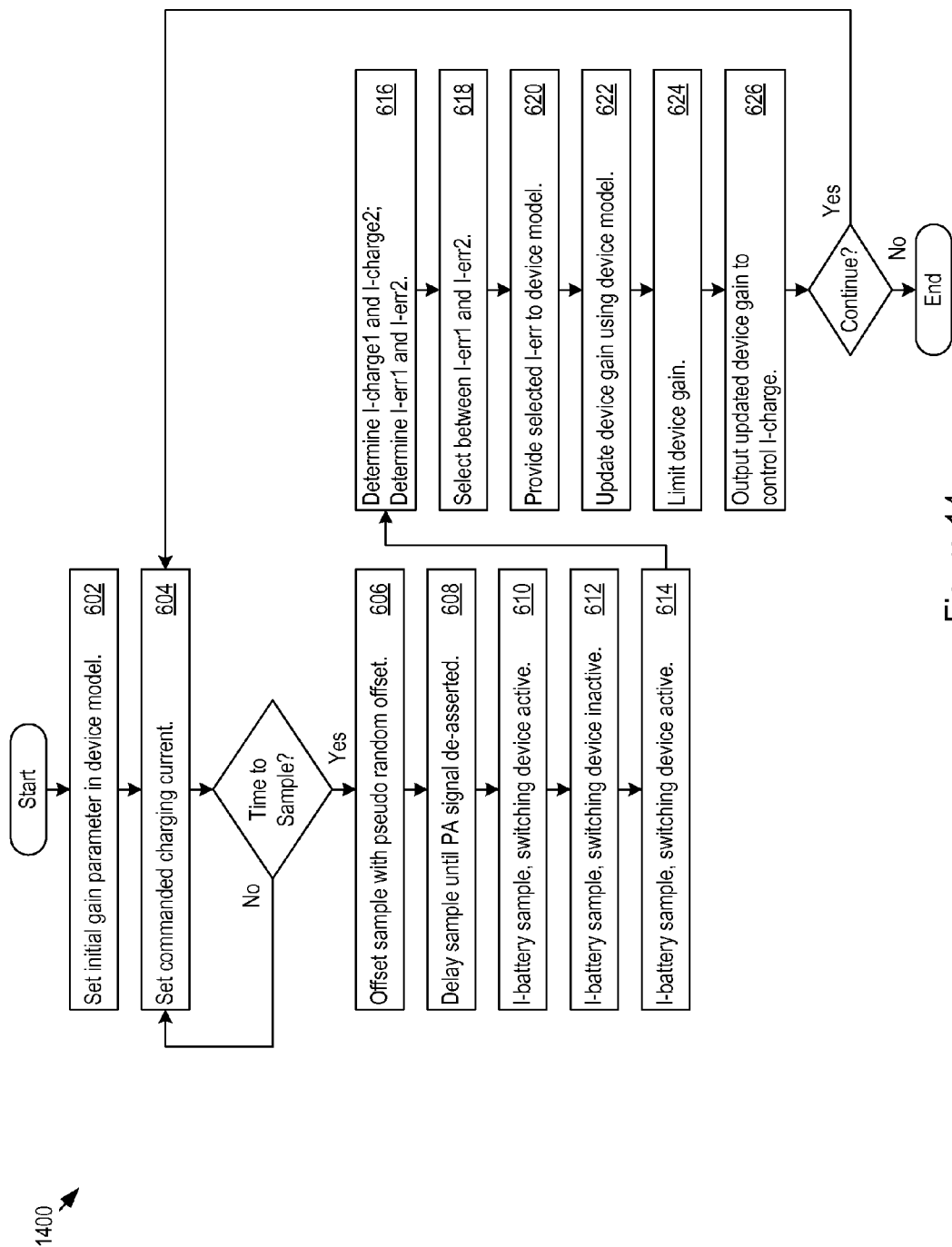
FIG. 14 shows logic that a power management unit may implement.

FIG. 14 shows logic 1400 that a power management unit may implement. The logic 1400 sets an initial gain parameter in the device model 124 (602). For example, the initial gain parameter maybe set artificially high, e.g., at 1000. The logic 1400 also sets the commanded charging current (604), using, for example, the CC-Set loop 404 or other control loops in the PMU 102 and the restriction logic 410. When the time to sample I-battery has arrived (e.g., every 100 ms), the PMU 102 may offset each sample with a pseudo random offset (606), and may also delay any sample until the PA signal is de-asserted (608).

As described above, the logic 1400 takes a first I-battery sample with the switching device 204 active and supplying I-charge (610). The logic 1400 takes a second I-battery sample with the switching device 204 inactive and with the power supply 106 supplying the system current (612). In addition, the logic 1400 takes a third I-battery sample with the switching device 204 active (614). From these three measurements, the logic 1400 determines I-charge1 and I-charge2, as well as the corresponding error terms I-err1 and I-err2 (616).

The logic 1400 selects between I-err1 and I-err2 (618), for example by choosing the minimum value. The selected I-err is provided to the device model 124 (620) which updates the modeled device gain (622) in response to I-err. The device model 124 may limit the device gain (624) to ensure that it does not exceed a maximum or fall below a minimum value. The device model outputs the updated device gain to control I-charge (626).

The PMU 102 may be described in many ways, with one example given above. As another example, the PMU 102 may be described as including a switching device control output for controlling a switching device 204, a device power supply 106 current measurement input, and a switching device model 124 comprising a model parameter for the switching device (e.g., gain or beta). The power management unit is configured to determine, from the device power supply current measurement input, charging current drawn from a charging power source and adjust the switching device control output according to the model parameter to control the charging current (e.g., toward a commanded value I-cmd).

The PMU 102 may be configured to determine the charging current by taking a first measurement from the device power supply current measurement input while the switching device control output permits the charging current to flow through the switching device, taking a second measurement from the from the device power supply current measurement input while the switching device control output has stopped the charging current from flowing through the switching device, determining the difference between the first measurement and the second measurement. The PMU 102 may also make any number of additional measurements of the charging current for use in updating the device model 124.

In operation, the PMU 102 may implementing a charging starting period (e.g., a soft start) by driving the switching device control output according to the model parameter set to initially reduce the charging current. The PMU 102 may also determine the charging current at multiple points in time, and after at least one of the multiple points in time, drive the switching device control output to increase the charging current, e.g., toward a commanded value I-cmd. The multiple points in time may be pseudo-random points in time, and may avoid activation or deactivation of a power amplifier or other noisy circuitry in the device 100.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The charging control capability of the system may be distributed among multiple system components, such as among multiple processors and memories. Parameters, models, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the charging control described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A power management unit comprising:
   a switching device control output for controlling a switching device;
   a device power supply current measurement input; and
   switching device model circuitry in communication with the switching device control output and the device power supply current measurement input, the switching device model circuitry comprising memory configured to store a model parameter for the switching device; and
   charging logic configured to:
      determine, from the device power supply current measurement input, charging current drawn from a charging power source;
      access the model parameter, the model parameter comprising a starting value set to deliberately exceed an actual parameter value for the switching device; and
      adjust the switching device control output according to the model parameter to deliberately initially limit the charging current.

2. The device of claim 1, where:
   the power supply current measurement input comprises a rechargeable battery current measurement input.

3. The device of claim 1, where the charging logic is configured to determine the charging current by:
   taking a first measurement from the device power supply current measurement input while the switching device control output permits the charging current to flow through the switching device;
   taking a second measurement from the from the device power supply current measurement input while the switching device control output has stopped the charging current from flowing through the switching device; and determining a difference between the first measurement and the second measurement.

4. The device of claim 1, where the model parameter comprises a transistor gain.

5. The device of claim 1, where the charging logic is further configured to:
determine the charging current at multiple points in time, and after at least one of the multiple points in time, drive the switching device control output to increase the charging current.

6. The device of claim 1, where the charging logic is further configured to:
determine the charging current at multiple pseudo-random points in time to avoid periodic measurement, and after at least one of the multiple pseudo-random points in time, drive the switching device control output to increase the charging current.

7. The device of claim 1, where the charging logic is further configured to:
correct the model parameter by determining the charging current at multiple points in time; and
responsive to determining the current at multiple points in time, increase the charging current to an amount specified by a commanded current value.

8. The power management unit of claim 1, where the charging logic is further configured to adjust the switching device control output by increasing the charging current over time.

9. A method comprising:
determining, from a device power supply current measurement input, charging current drawn from a charging power source;
accessing a model parameter from switching device model circuitry, the model parameter comprising a starting value set to deliberately exceed an actual model parameter value for the switching device; and
adjusting a switching device control output according to the model parameter to deliberately initially limit the charging current, the switching device control output in data communication with the switching device model circuitry.

10. The method of claim 9, wherein the model parameter comprises gain of the switching device.

11. The method of claim 9, wherein adjusting comprises:
increasing the charging current over time.

12. The method of claim 9, wherein adjusting comprises:
increasing the charging current over time after determining the charging current to ensure the charging current is within predetermined boundaries.

13. The method of claim 9, wherein determining the charging current comprises:
taking a first measurement of a battery current when the charging current is flowing to a rechargeable battery;
taking a second measurement of the battery current when the charging current has stopped flowing to the rechargeable battery; and
determining a difference between the first measurement and the second measurement.

14. The method of claim 9, wherein:
the charging current comprises a battery current through a rechargeable battery and a supplemental current; and
the supplemental current comprises digital logic current, power amplifier current, or both.

15. The method of claim 9, further comprising:
correcting the model parameter by determining the charging current at multiple points in time; and
responsive to determining the current at multiple points in time, increasing the charging current to an amount specified by a commanded current value.

16. A charging system comprising:
charging circuitry comprising:
a switching device control output configured to control a switching device; and
a battery current sensor in communication with the switching device, the battery current sensor configured to detect a battery current; and
a power management unit comprising:
memory configured to store a switching model for the switching device; and
charging current measurement circuitry configured to:
determine a charging current using a measurement of battery current by the battery current sensor;
access a model parameter from the switching model, the model parameter comprising a starting value set to deliberately exceed an actual model parameter value for the switching device; and
adjust the switching device control output according to the model parameter to deliberately initially limit the charging current.

17. The charging system of claim 16, wherein the model parameter comprises a gain parameter for the switching device.

18. The charging system of claim 16, wherein the charging current measurement circuitry is configured to cause the switching device control output to increase the charging current over time.

19. The charging system of claim 16, wherein the charging current measurement circuitry is configured to cause the switching device control output to increase the charging current over time starting when a charging operation begins.

20. The charging system of claim 16, wherein the charging current measurement circuitry is configured to cause the switching device control output to incrementally increase the charging current.

21. The charging system of claim 16, wherein the charging current measurement circuitry is configured to:
cause the switching device control output to incrementally increase the charging current after determining the charging current; and
determine that the charging current meets a charging current criteria.

* * * * *